US008681233B2

(12) United States Patent  
Thorson

(10) Patent No.: US 8,681,233 B2  
(45) Date of Patent: Mar. 25, 2014

(54) CAMERA IMAGE EDITING USING A TELEVISION

(71) Applicant: Sony Corporation, Tokyo (JP)

(72) Inventor: Bradley James Thorson, Ramona, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/910,351

(22) Filed: Jun. 5, 2013

(65) Prior Publication Data

US 2013/0265458 A1 Oct. 10, 2013

Related U.S. Application Data

(62) Division of application No. 12/661,375, filed on Mar. 16, 2010, now Pat. No. 8,477,204.

(51) Int. Cl.  
*H04N 5/225* (2006.01)

(52) U.S. Cl.  
USPC .......................................... 348/211.8; 348/553

(58) Field of Classification Search  
USPC ................. 348/211.99–211.14; 715/700–726  
See application file for complete search history.

(56) References Cited

U.S. PATENT DOCUMENTS

| 5,675,358 | A | * | 10/1997 | Bullock et al. ................ 345/420 |
| 5,889,506 | A | | 3/1999 | Lopresti et al. |
| 6,008,836 | A | | 12/1999 | Bruck et al. |
| 6,624,846 | B1 | * | 9/2003 | Lassiter ...................... 348/211.4 |
| 7,161,619 | B1 | * | 1/2007 | Niida et al. ............... 348/207.11 |
| 7,685,341 | B2 | * | 3/2010 | Steinberg et al. ............... 710/72 |
| 7,893,961 | B2 | * | 2/2011 | Shinkai ...................... 348/207.1 |
| 2004/0100486 | A1 | | 5/2004 | Flamini et al. |
| 2005/0162718 | A1 | | 7/2005 | Kim et al. |
| 2007/0071436 | A1 | * | 3/2007 | Mayuzumi ..................... 396/310 |
| 2009/0073271 | A1 | * | 3/2009 | Grenlund et al. .......... 348/211.8 |
| 2011/0228110 | A1 | | 9/2011 | Thorson |

FOREIGN PATENT DOCUMENTS

WO    WO 01/57683    8/2001

OTHER PUBLICATIONS

Allbritton, Microsoft TV Photo Viewer, Popular Mechanics, Oct. 2002.  
Election Requirement, U.S. Appl. No. 12/661,375, Aug. 24, 2012.  
Non-Final Office Action, U.S. Appl. No. 12/661,375, Jan. 17, 2013.  
Notice of Allowance, U.S. Appl. No. 12/661,375, Apr. 17, 2013.

* cited by examiner

*Primary Examiner* — Twyler Haskins  
*Assistant Examiner* — Dwight C Tejano  
(74) *Attorney, Agent, or Firm* — Jerry A. Miller; Miller Patent Services

(57) ABSTRACT

Images stored in a camera are edited using a television. Television remote control output signals are received at the camera. The television remote control output signals are converted to camera image editing commands. An image stored in a memory associated with the camera is edited based upon the camera image editing commands. The edited image is output to the television. This abstract is not to be considered limiting, since other embodiments may deviate from the features described in this abstract.

41 Claims, 6 Drawing Sheets

CAMERA IMAGE EDITING USING A TELEVISION

CROSS REFERENCE TO RELATED DOCUMENTS

This application is a Divisional of allowed U.S. patent application Ser. No. 12/661,375 filed Mar. 16, 2010 which is hereby incorporated by reference herein.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Cameras allow users to take pictures and to create images of persons, events, landscapes, and other things. Digital cameras allow users to take pictures and store the created images electronically.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
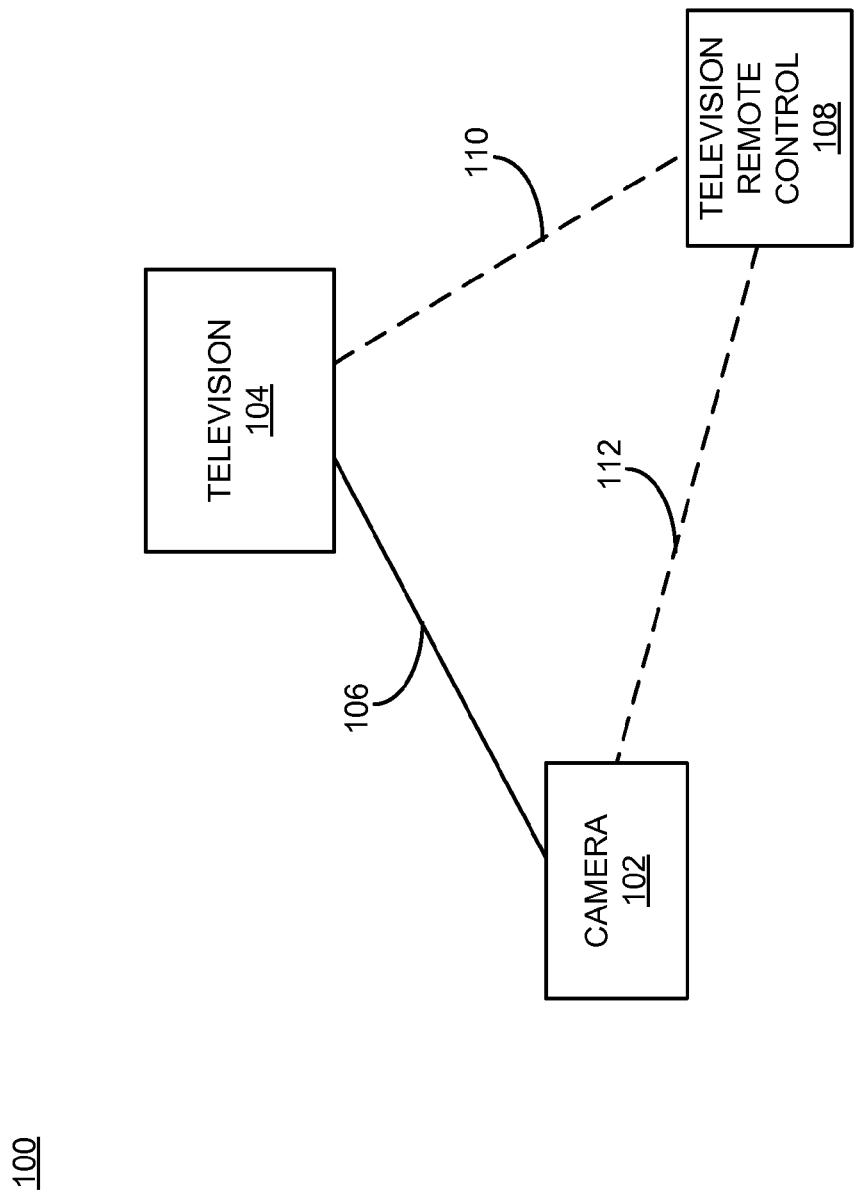
FIG. 1 is a block diagram of an example of an implementation of a system for automated camera image editing using a television consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system having one or more processors.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The present subject matter provides automated camera image editing using a television. In a first implementation, a camera detects a connection to a television. The camera sends an indication to the television that the camera includes television remote control editing capabilities. The camera queries the television and receives television information, such as a manufacturer and/or model information, display resolution, and display refresh frequency, from the television. The camera may alternatively determine the manufacturer and/or model information based upon received television remote control output signals. The camera selects television remote control command translation information based upon the received or determined television information. The camera remote control information may include, for example, a set or batch of key translations for translating television remote control signals to camera image editing commands. The camera converts received television remote control output signals to camera image editing commands using the key translations. The camera image editing commands may include camera user interface image editing commands associated with a user interface of the camera. The camera processes the camera image editing commands to select one or more stored images for editing and to edit the selected stored image(s). The camera outputs the edited image(s) to the television at the display resolution and refresh rate of the television display throughout an image editing session. The camera modifies and refreshes the output of the edited image in response to each camera image editing command.

In an alternative implementation, the television detects a connection to a camera and queries the camera to determine whether the camera includes television remote control editing capabilities. In response to the query, the camera sends an indication to the television that the camera includes television remote control editing capabilities. The television queries the camera and receives camera information, such as a manufacturer and/or model information from the camera. The television sends display resolution and display refresh frequency information to the camera. The television selects television remote control command translation information based upon the received camera information. The television converts received television remote control output signals to camera image editing commands, such as camera user interface image editing commands. The television sends the camera image editing commands to the camera. The camera responds to the received camera image editing commands to select a stored image for editing and to edit the selected stored image. The camera outputs the edited image to the television at the display resolution and refresh rate of the television display throughout an image editing session. The camera modifies and refreshes the output of the edited image in response to each camera image editing command.

As an additional alternative implementation, the television alternatively detects a connection to the camera, receives signaling from the camera, and determines that the camera includes the television remote control editing capabilities based upon the received signaling. The television may send the television information to the camera in response to determining the camera includes the television remote control editing capabilities or may send the television information in response to receipt of a request or query for the television information from the camera. The television may alternatively send a sequence of television remote control output signals to the camera, and the camera may determine the television information based upon the sequence of television remote control output signals. During editing, television remote control output signals received from a television remote control may be sent to the camera and the television may receive the edited image from the camera, and may display the edited image on a display associated with the television. The edited image may be received at the refresh rate and resolution of the television display so that the television does not need to modify the received display content.

In yet another implementation, the camera and the television may negotiate to determine which device performs the conversion of the received television remote control output signals to the camera image editing commands. As such, either the camera or the television may perform the respective conversions of the received television remote control output signals to the camera image editing commands. Accordingly, many variations of the present subject matter are possible and all are considered within the scope of the present subject matter.

Regardless of the respective implementation discussed above, the camera may also output a camera user interface and/or camera user interface objects to the television for display. Accordingly, the camera may output its native user interface to the television and a user of the television may view the camera user interface in a larger format on a display associated with the television. The user may also use a remote control associated with the television to navigate the camera user interface to edit images stored in the camera. The image editing module of the camera may remain within the camera, to minimize functional requirements for the television to perform the camera image editing using a television described herein.

Changes to the camera user interface and/or camera user interface objects resulting from the camera user interface image editing commands may be output to the television in association with the edited image. The camera may also output a set of stored images as thumbnail images in association with such a camera user interface to the television to allow selection of an image for editing from the set of thumbnail images. Accordingly, the camera may provide a camera user interface via the television display device and interpret television remote control output signals for editing the image. As such, the television does not need to include image editing capabilities for images stored in association with the camera.

A host of image editing features may be performed by the camera in response to receipt of the television remote control output signals. For example, stored images within the camera may be rotated, cropped, adjusted for contrast, adjusted for brightness, red-eye effects may be eliminated, images may be morphed, drawing on top of images may be performed, and color changes to an image may be performed. Many other image editing options are possible and all are considered within the scope of the present subject matter.

Bulk editing may be performed in association with an editing session. For example, resizing of all images for storage conservation may be performed, such as reducing all images to two hundred and fifty six kilobytes (256 kb) from three megabytes (3 MB). Bulk rotating, cropping, contrast and brightness adjustment or other bulk editing may also be performed. Many other variations of bulk editing are possible and all are considered within the scope of the present subject matter.

The television remote control output signals may be received from the television, such as via a bi-directional universal serial bus (USB) or component television connection. Alternatively, where such a bi-directional connection is not available, an infrared, wireless, (e.g., Bluetooth®, radio frequency (RF) or other wireless), or other dongle may be associated with the camera that detects the television remote control output signals. The camera may output a list of television manufacturers and television model information, either via the television or via a display associated with the camera. The camera may output a prompt requesting user selection of a television manufacturer and television model information from the list of television manufacturers and television model information. The camera may detect a selection from the list of television manufacturers and television model information and select the television remote control command translation information based upon the detected selection.

As described above, the television may receive the edited image as part of a camera user interface output from the camera including user interface objects responsive to the television remote control output signals sent to the camera. The camera user interface may include a set of thumbnail images that represent selectable images for editing that are stored in association with the camera. The television may receive a selected one of the set of thumbnail images in response to sending television remote control output signals received from the television remote control to the camera that are converted by the camera into a user interface selection command of the selected image.

As such, the present subject matter provides for a flexible user interface via a television associated with image editing of images stored in a camera. Because the camera performs the actual editing and renders output for display at the television while the television operates as an enhanced and larger user interface with a television remote control for user input, complexity of implementation may be reduced.

Turning now to FIG. 1, FIG. 1 is a block diagram of an example of an implementation of a system 100 for automated camera image editing using a television. A camera 102 interconnects to a television 104 via a connection 106. The connection 106 may include a universal serial bus (USB), component television connection, or other interconnection. As such, the connection 106 may be either bi-directional or uni-directional as appropriate for a given implementation. It is understood that certain communications described herein between the camera 102 and the television 104 are described as bi-directional communications. As such, appropriate bi-directional connectivity may be implemented for the connection 106 in such an implementation. Alternatively, for uni-directional implementations, the camera 102 may prompt a user for user input of certain information, such as a selection of television information (e.g., manufacturer and/or model information) to allow the camera to select television remote control command translation information for the television 104. Many variations on signaling and interconnection are possible for the connection 106 and all are considered within the scope of the present subject matter.

A television remote control device 108 represents a remote control associated with the television 104, such as a remote control developed and sold with the television 104 or a universal remote control that has been programmed to generate remote control output signals for the television 104. The television remote control device 108 may communicate directly with the television 104 via signaling 110. As described above, the signaling 110 may include infrared, wireless (e.g., Bluetooth®, RF, or other wireless), or other signaling. For a bi-directional implementation of the connection 106, the television 104 receives television remote control output signals from the television remote control device 108 and sends these received television remote control output signals to the camera 102 via the connection 106. For a uni-directional implementation of the connection 106, the camera 102 may receive the television remote control output signals from the television remote control device 108 via signaling 112. The signaling 112 may be received at the camera 102 via a dongle or other input (See FIG. 2) associated with the camera 102. As with the signaling 110, the signaling 112 may include infrared, wireless (e.g., Bluetooth®, RF, or other wireless), or other signaling.

For either bi-directional or uni-directional connectivity between the camera 102 and the television 104, the television remote control output signals are received at the camera and processed as described above and in more detail below. The camera 102 converts the received television remote control output signals into camera image editing commands associated with a user interface of the camera 102. The camera image editing commands may include editing commands for editing images stored in association with the camera 102. An image stored in the camera 102 may be edited based upon the camera image editing commands and output to the television 104 via the connection 106 for display at the television 104. As such, the television 104 provides a user-interface rendering platform for the camera 102. The television remote control device 108 provides user-interface input for the camera 102.

Figure 2:
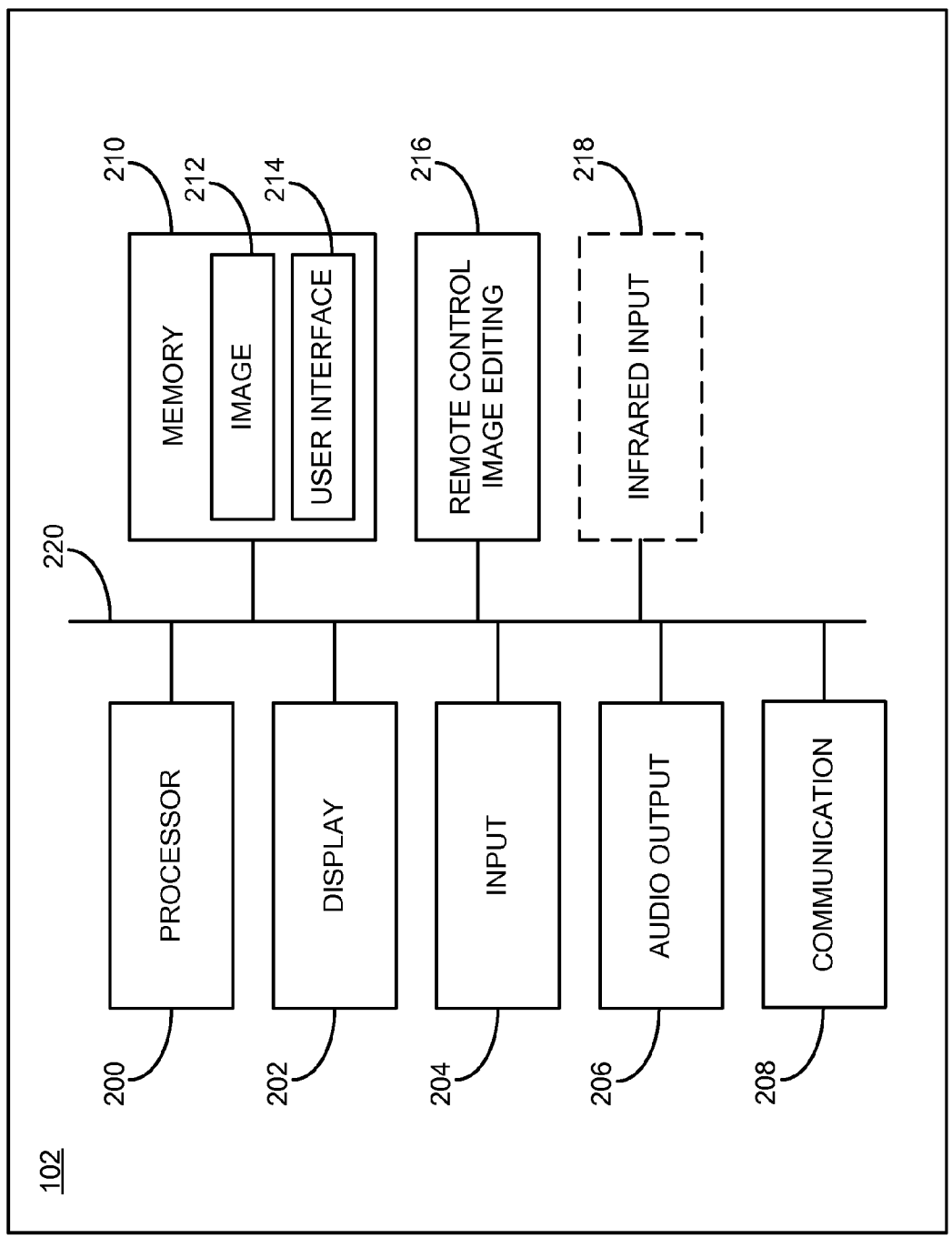
FIG. 2 is a block diagram of an example of an implementation of a camera that provides automated camera image editing using a television consistent with certain embodiments of the present invention.

FIG. 2 is a block diagram of an example of an implementation of the camera 102 that provides automated camera image editing using a television. It is understood that the present description of the camera 102 may also be applied to the television 104. However, as described above and in more detail below, complementary operations may be performed by the respective devices. It should further be noted that the camera 102 may include a stand-alone camera product, a camera associated with a mobile telephone, or any other device capable of capturing and/or storing images. As such, the present subject matter may be implemented in association with any such device to perform the automated camera image editing using a television described herein.

A processor 200 provides computer instruction execution, computation, and other capabilities within the camera 102. A display device 202 provides visual and/or other information to a user of the camera 102. The display device 202 may include any type of display device, such as a cathode ray tube (CRT), liquid crystal display (LCD), light emitting diode (LED), projection or other display element or panel. An input device 204 provides input capabilities for the user of the camera 102. The input device 204 may include a user-interface keypad associated with the camera 102 or other input device. One or more input devices, such as the input device 204, may be used.

An audio output device 206 provides audio output capabilities for the camera 102, such as output of user-interface prompts and/or playback of audio information stored in association with stored images. The audio output device 206 may include a speaker, driver circuitry, and interface circuitry as appropriate for a given implementation.

A communication module 208 provides communication capabilities for interaction with the television 104 for indicating to the television 104 that the camera 102 includes television remote control editing capabilities, and for receiving television information (e.g., manufacturer and/or model information) from the television 104. The communication module 208 also provides display output signals and signaling for sending renderable output of stored and/or edited images to the television 104. Other possibilities exist for communications via the communication module 208 and all are considered within the scope of the present subject matter.

It should be noted that the communication module 208 is illustrated as a component-level module for ease of illustration and description purposes. It is also understood that the communication module 208 may include any hardware, programmed processor(s), and memory used to carry out the functions of the communication module 208. For example, the communication module 208 may include additional controller circuitry in the form of application specific integrated circuits (ASICs), processors, and/or discrete integrated circuits and components for performing electrical control activities associated with the communication module 208. Additionally, the communication module 208 may include interrupt-level, stack-level, and application-level modules as appropriate. Furthermore, the communication module 208 may include any memory components used for storage, execution, and data processing by these modules for performing processing activities associated with the communication module 208. The communication module 208 may also form a portion of other circuitry described below without departure from the scope of the present subject matter.

A memory 210 includes an image storage area 212. The image storage area 212 stores images in association with the camera 102 for editing as described above and in more detail below. It should be noted that the image storage area 212 may be incorporated into a removable medium, such as a memory stick or other image storage device.

A user interface module 214 provides user interface capabilities for the camera 102. The user interface capabilities include capturing images, storing images, rendering images, and editing images stored in association with the camera 102, such as in the image storage area 212.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area suitable for storage of the information and storage and execution of the respective applications and any firmware associated with a programmed processor that forms a portion of other components associated with the camera 102, as appropriate. It is also understood that other information may also be stored within the memory 210 as appropriate for a given implementation without departure from the scope of the present subject matter. Further, at least a portion of the memory 210 may include a removable memory device, such as a FLASH drive, memory stick, or other removable medium.

A remote control image editing module 216 provides the television remote control-based image processing and editing capabilities for the camera 102 associated with the present subject matter. For example, the remote control image editing module 216 detects a connection to the television via the communication module 208. The remote control image editing module 216 sends an indication to the television 104 via the communication module 208 that the camera 102 includes television remote control editing capabilities. The remote control image editing module 216 also receives the television remote control output signals and converts the received television remote control output signals to camera image editing commands associated with the user interface module 214 of the camera 102. The remote control image editing module 216 sends the converted camera image editing commands to the user interface module 214 for processing in association with image selection and editing. The remote control image editing module 216 also sends edited images to the television 104 via the connection 208 for rendering via the television 104. Many other possibilities exist for the remote control image editing module 216 and all are considered within the scope of the present subject matter.

It should be noted that the remote control image editing module 216 is illustrated as a component-level module for ease of illustration and description purposes. It is also understood that the remote control image editing module 216 may include any hardware, programmed processor(s), and memory used to carry out the functions of the remote control image editing module 216 as described above and in more detail below. For example, the remote control image editing module 216 may include additional controller circuitry in the form of application specific integrated circuits (ASICs), processors, and/or discrete integrated circuits and components for performing electrical control activities associated with the remote control image editing module 216. Additionally, the remote control image editing module 216 may include interrupt-level, stack-level, and application-level modules as appropriate. Furthermore, the remote control image editing module 216 may include any memory components used for storage, execution, and data processing for performing processing activities associated with the remote control image editing module 216.

It should be noted that the remote control image editing module 216 may also form a portion of other circuitry described below without departure from the scope of the present subject matter. Further, the remote control image editing module 216 may alternatively be implemented as an application stored within the memory 210. In such an implementation, the remote control image editing module 216 may include instructions executed by the processor 200 for performing the functionality described herein. The processor 200 may execute these instructions to provide the processing capabilities described above and in more detail below for the camera 102. The remote control image editing module 216 may form a portion of an interrupt service routine (ISR), a portion of an operating system, or a portion of a separate application without departure from the scope of the present subject matter.

An infrared input module 218 provides infrared input capabilities to receive television remote control output signals directly from the television remote control device 108. As described above, the infrared input module 218 may be used for uni-directional communication implementations of the communication module 208. As such, the infrared input module 218 is represented as a dashed-line component to show that it is optional and may be used as appropriate for a given implementation. As also described above, the infrared input module 218 may be implemented as a dongle externally connected to the camera 102 without departure from the scope of the present subject matter. It should further be noted that the infrared input module 218 is shown for purposes of example. Alternatively, a wireless (e.g., Bluetooth®, RF, or other wireless) input module, or other signaling input module may be used as appropriate for a given implementation.

The processor 200, the display device 202, the input device 204, the audio output device 206, the communication module 208, the memory 210, the remote control image editing module 216, and the infrared input module 218 are interconnected via one or more interconnections shown as interconnection 220 for ease of illustration. The interconnection 220 may include a system bus, a network, or any other interconnection capable of providing the respective components with suitable interconnection for the respective purpose.

FIG. 3 through FIG. 6 below describe example processes that may be executed by such devices, such as the camera 102 or the television 104, to perform the automated camera image editing using a television associated with the present subject matter. Many other variations on the example processes are possible and all are considered within the scope of the present subject matter. The example processes may be performed by modules, such as the remote control image editing module 216 and/or executed by the processor 200, associated with such devices. It should be noted that time out procedures and other error control procedures are not illustrated within the example processes described below for ease of illustration purposes. However, it is understood that all such procedures are considered to be within the scope of the present subject matter.

Figure 3:
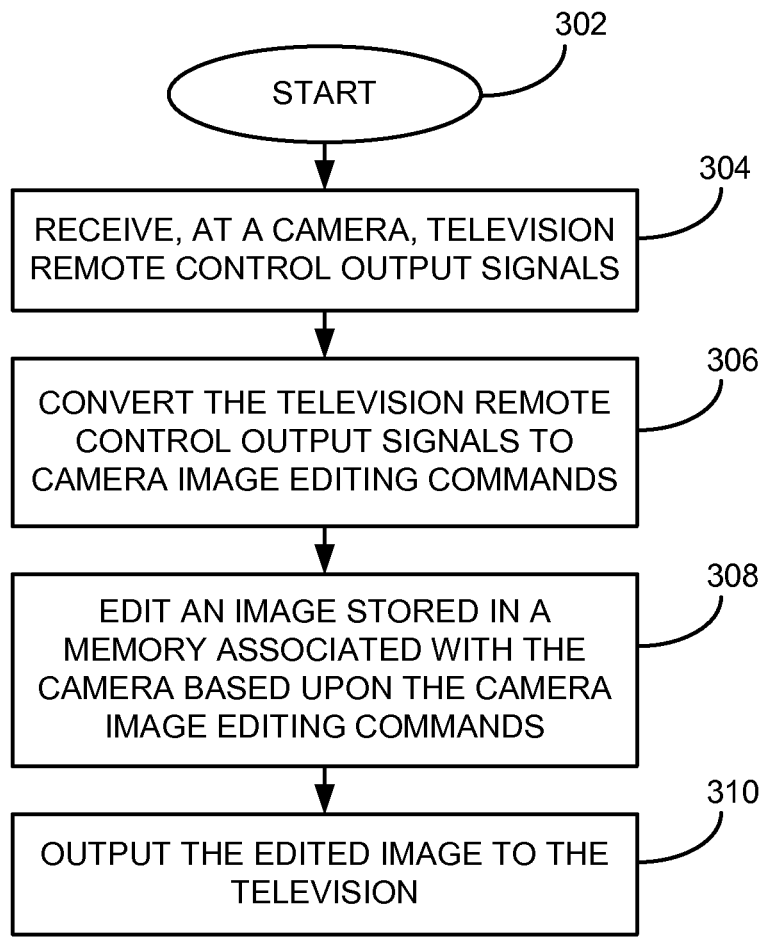
FIG. 3 is a flow chart of an example of an implementation of a process executable by a camera that provides automated camera image editing using a television at a camera device consistent with certain embodiments of the present invention.

FIG. 3 is a flow chart of an example of an implementation of a process 300 executable by a camera that provides automated camera image editing using a television at a camera device, such as the camera 102. The process 300 starts at 302. At block 304, the process 300 receives, at the camera, television remote control output signals. At block 306, the process 300 converts the television remote control output signals to camera image editing commands. At block 308, the process 300 edits an image stored in a memory associated with the camera based upon the camera image editing commands. At block 310, the process 300 outputs the edited image to the television.

Figure 4:
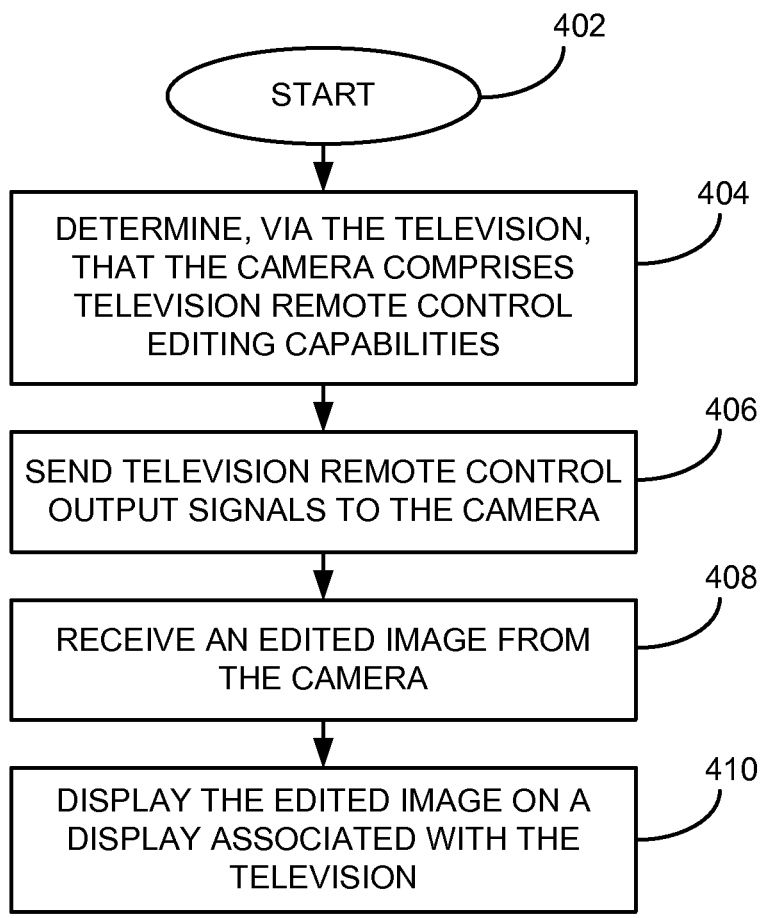
FIG. 4 is a flow chart of an example of an implementation of a process that provides automated camera image editing using a television at a television device consistent with certain embodiments of the present invention.

FIG. 4 is a flow chart of an example of an implementation of a process 400 that provides automated camera image editing using a television at a television device, such as the television 104. The process 400 starts at 402. At block 404, the process 400 determines, via the television, that the camera comprises television remote control editing capabilities. At block 406, the process 400 sends television remote control output signals to the camera. At block 408, the process 400 receives an edited image from the camera. At block 410, the process 400 displays the edited image on a display associated with the television.

Figure 5:
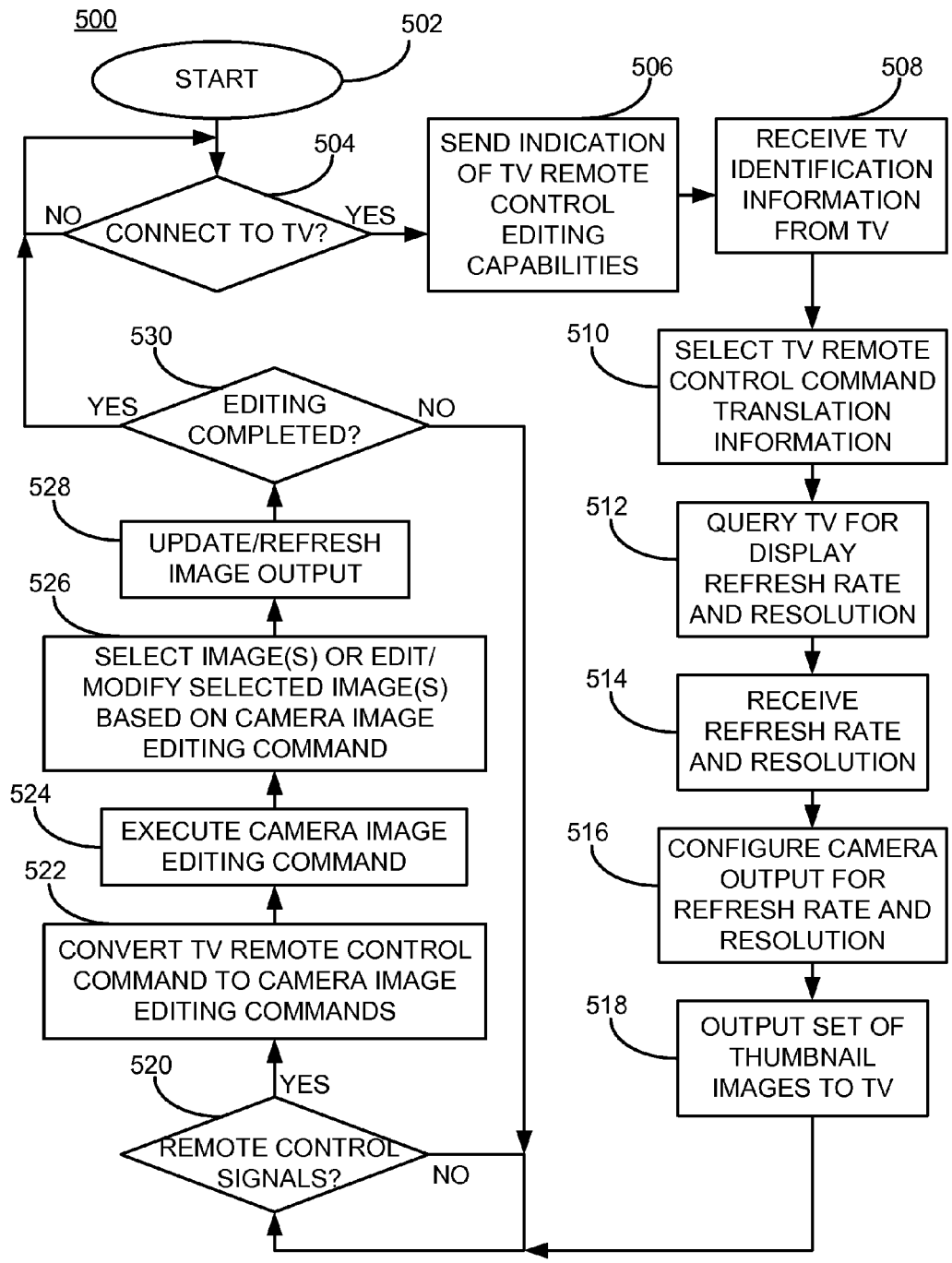
FIG. 5 is a flow chart of an example of an implementation of a process that provides automated camera image editing using a television at a camera device consistent with certain embodiments of the present invention.

FIG. 5 is a flow chart of an example of an implementation of a process 500 that provides automated camera image editing using a television at a camera device, such as the camera 102. The process 500 starts at 502. At decision point 504, the process 500 makes a determination as to whether a connection to a television, such as the television 104, has been detected or whether another indication to begin an editing session between the camera 102 and the television 104 has been detected. When a determination is made that a connection to a television has been detected or that another indication to begin an editing session between the camera 102 and the television 104 has been detected, the process 500 sends an indication to the television that the camera comprises television remote control editing capabilities at block 506. At block 508, the process 500 receives television identification information from the television 104 in response to sending the indication that the camera comprises the television remote control editing capabilities. Receiving the television identification information may include receiving a message from the television 104 that includes the television identification information. Alternatively, receiving the television identification information may include receiving television remote control output signals, such as a sequence of television remote control output signals, from the television 104 and determining the television identification information based upon the received television remote control output signals. As described above, the television identification information may include television manufacturer information, television model information, or other identifying information associated with the television 104.

At block 510, the process 500 selects television remote control command translation information based upon the received television identification information. At block 512, the process 500 queries the television 104 for a refresh rate and a display resolution of a display associated with the television 104. For example, television refresh rates may include sixty hertz (60 hz), one hundred and twenty hertz (120 hz), two hundred and forty hertz (240 hz), or other refresh rate as appropriate for a given implementation. Display resolutions may include pixel dimensions for the display (e.g., 1920×1200), resolutions such as 720p and 1080p for high definition displays, or other resolution as appropriate for a given implementation. At block 514, the process 500 receives the television refresh rate and display resolution of the display associated with the television 104. At block 516, the process 500 configures the camera output for the received refresh rate and resolution of the display associated with the television 104.

At block 518, the process 500 outputs a set of thumbnail images to the television 104. As described above, the camera 102 may output its native user interface at the refresh rate and resolution of the display associated with the television 104. As such, outputting the set of thumbnail images to the television 104 may include outputting the set of thumbnail images to the television 104 as part of the native user interface of the camera 102 to the television 104.

At decision point 520, the process 500 makes a determination as to whether any television remote control output signals have been detected. As described above, the television remote control output signals may be detected and received from the television 104. Alternatively, for implementations with a unidirection connection to the television 104, the television remote control output signals may be detected and received via a signaling input module, such as the infrared input module 218, or a wireless (e.g., Bluetooth®, RF, or other wireless) input module, or other signaling input module associated with the camera 102. When a determination is made that television remote control output signals have been detected, the process 500 converts the television remote control output signals to one or more camera image editing commands at block 522. As described above, the camera image editing command(s) may include camera user interface editing command(s).

At block 524, the process 500 executes the camera image editing command(s). For a first iteration of the process 500, the process 500 may interpret the executed camera image editing command(s) as a selection command for one or more of the displayed thumbnail images for editing, or all of the displayed thumbnail images for bulk editing. As such, at block 526, the process 500 may select one or more of the displayed thumbnail images for editing, or all of the displayed thumbnail images for bulk editing. During subsequent iterations, editing functions may be performed at block 526 in response to the camera image editing commands. Selection of one or more images for editing may include retrieving the selected stored image(s) from memory 210 associated with the camera 102. Editing the selected image(s) may include modifying the stored image(s) based upon the camera image editing command(s). Changes to the modified image(s) may be stored in the memory 210 in response to any such editing of the image(s). Editing of the image(s) may include rotating the image, cropping the image, adjusting contrast of the image, adjusting a brightness of the image, eliminating red-eye effects within the image, morphing the image, drawing on top of the image, changing color of the image, or any other editing associated with a stored image(s).

As described above, bulk editing may include resizing all images for storage conservation, such as reducing all images to two hundred and fifty six kilobytes (256 kb) from three megabytes (3 MB). Bulk rotating, cropping, contrast and brightness adjustment or other bulk editing may also be performed. Many other variations of bulk editing are possible and all are considered within the scope of the present subject matter.

At block 528, the process 500 refreshes the output from the camera 102. During a first iteration of the process 500, the refreshed output may include displaying a larger version of the selected thumbnail image(s) for editing or other appropriate output for bulk editing operations. During subsequent iterations of the process 500, the refreshed output may include output of the edited image(s) to the television 104 in response to each modification of the stored image(s). Refreshing the output may also include outputting a camera user interface to the television 104 comprising the edited image(s), including outputting camera user interface objects, such as a cursor, an editing pane with graphical editing selections, and other camera user interface objects as appropriate for a given implementation. Refreshing the output may also include outputting a changed camera user interface to the television 104 including a change to at least one of the camera user interface objects resulting from each camera user interface editing command and a change to the edited image. Many other variations of refreshing the output of the camera 102 to the television 104 are possible and all are considered within the scope of the present subject matter.

At decision point 530, the process 500 makes a determination as to whether editing is completed. The determination as to whether editing is completed may be performed, for example, in response to receiving and converting one or more television remote control output signals into a camera image editing command for ending an editing session for an image, and execution of the camera image editing command for ending the editing session for the image at the camera 102. When a determination is made at decision point 530 that the editing is not completed, the process 500 returns to decision point 520 to wait for receipt of additional television remote control output signals for processing and iterates as described above to edit the selected image. When a determination is made at decision point 530 that the editing is completed, the process 500 returns to decision point 504 to wait for a new connection of the camera 102 to the television 104 or another indication to begin an editing session.

As such, the process 500 provides for communicating television remote control editing capabilities from the camera 102 to the television 104, and selection of command translation information for received television remote control output signals. The process 500 also queries the television 104 for display refresh rate and resolution information and outputs a camera user interface at the display refresh rate and resolution of the display associated with the television 104. The process 500 allows a user to navigate a user interface of the camera 102 displayed on a display of the television 104, via a television remote control, such as the television remote control device 108. The process 500 interprets the received television remote control output signals, executes the commands within the native user interface of the camera 102, and edits a selected image stored within the camera 102. The process 500 outputs the editing results of the image stored in the camera 102 to the television 104.

Figure 6:
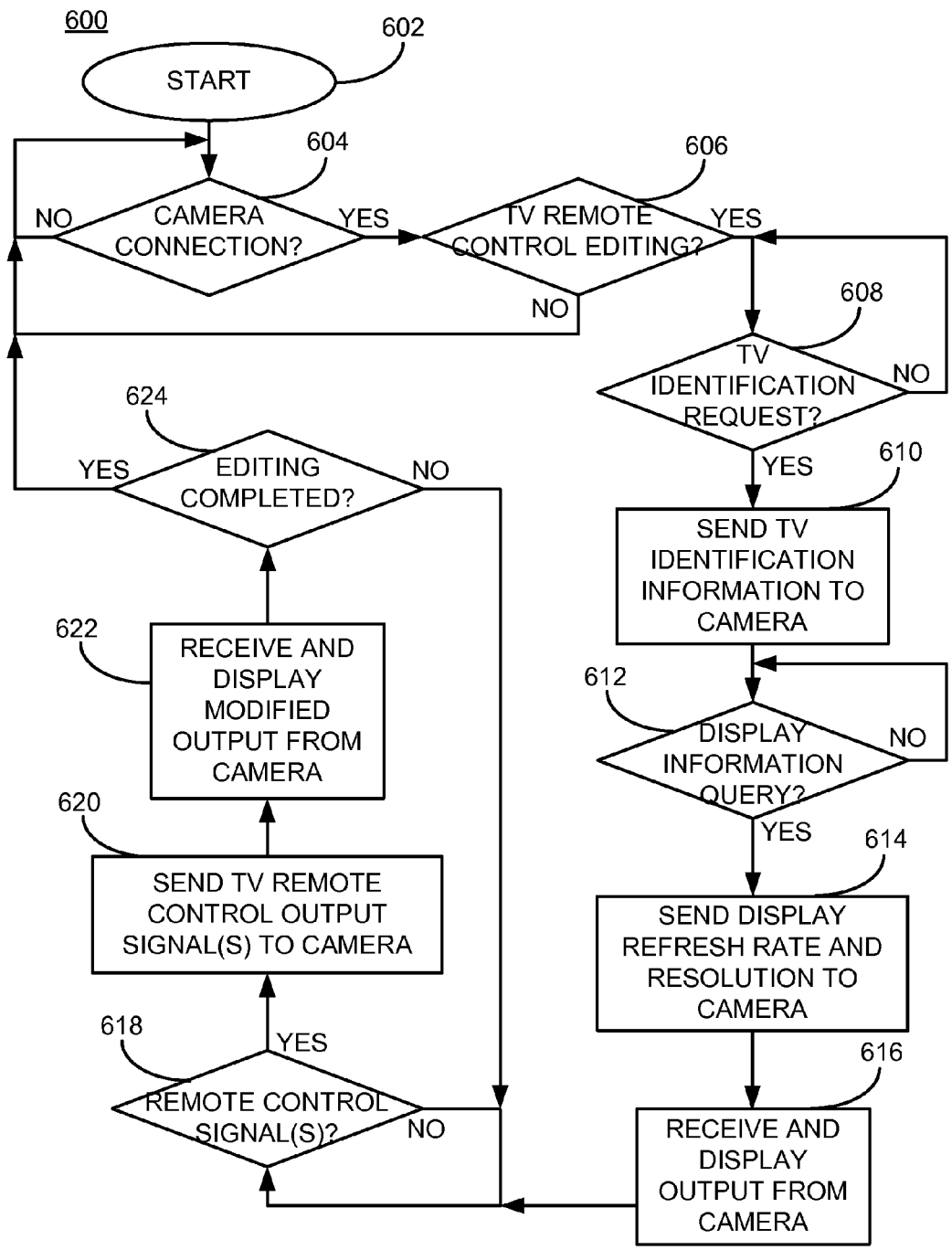
FIG. 6 is a flow chart of an example of an implementation of a process that provides automated camera image editing using a television at a television device consistent with certain embodiments of the present invention.

It should be noted that, though not depicted within FIG. 5 for ease of description purposes, additional processing may be included within a process, such as the process 500 without departure from the scope of the present subject matter. For example, upon determining that a bi-directional messaging interface with the television 104 is not available, a process such as the process 500 may output a list of television manufacturers and television model information, such as via a display device 202 associated with the camera 102 or a display associated with the television 104. Such a process may output a prompt requesting user selection of a television manufacturer and television model information from the list of television manufacturers and television model information. The process may further detect receipt of a selection of one of the television manufacturers and television model information and may select the command translation information based upon the selected one of the television manufacturers and television model information FIG. 6 is a flow chart of an example of an implementation of a process 600 that provides automated camera image editing using a television at a television device, such as the television 104. The process 600 starts at 602. At decision point 604, the process 600 makes a determination as to whether a connection to a camera, such as the camera 102, has been detected or whether another indication to begin an editing session between the camera 102 and the television 104 has been detected. When a determination is made that a connection to a camera has been detected or that another indication to begin an editing session between the camera 102 and the television 104 has been detected, the process 600 makes a determination at decision point 606 as to whether the camera 102 is configured for television remote control editing. For example, the television 104 may receive an indication from the camera 102 that the camera 102 includes television remote control editing capabilities. Alternatively, the television 104 may receive signaling from the camera 102 and determine the camera 102 includes the television remote control editing capabilities based upon the received signaling.

When a determination is made that the camera 102 is not configured for television remote control editing, the process 600 returns to decision point 604 to await a connection to a camera with television remote control editing capabilities.

When a determination is made that the camera 102 is configured for television remote control editing, the process 600 makes a determination at decision point 608 as to whether a television identification request has been received. As described above, the camera 102 may send a request for television information to the television 104. Alternatively, a list of television manufacturers and television model numbers may be received from the camera 102 and displayed via the display associated with the television 104. A user prompt may be displayed in association with the list of television manufacturers and model numbers and a user selection via the television remote control device 108 may be detected.

When a determination is made that a television identification request has been received or in response to detecting a selection of a television manufacturer and model number from the list of television manufacturers and television model numbers, the process 600 sends the television information to the camera 102 at block 610. As also described above, the camera 102 selects television remote control command translation information based upon the television information and converts the television remote control output signals to the camera image editing commands using the selected television remote control command translation information. Alternatively, the process 600 may send a sequence of television remote control output signals to the camera 102 at block 610 and the camera 102 may determine the television information based upon the sequence of television remote control output signals.

At decision point 612, the process 600 makes a determination as to whether a query has been received from the camera 102 for a refresh rate and a display resolution of a display associated with the television 104. When a determination is made that a query has been received from the camera 102 for the refresh rate and the display resolution of the display associated with the television 104, the process 600 sends the rate and the display resolution of the display associated with the television 104 to the camera 102 at block 614. At block 616, the process 600 receives and displays output from the camera 102 at the display refresh rate and resolution. As described above, a camera user interface including user interface objects and a set of thumbnail images may be received and displayed.

At decision point 618, the process 600 makes a determination as to whether any television remote control output signals have been detected and received from a remote control device, such as the television remote control device 108. When a determination is made that one or more television remote control output signals have been detected and received, the process 600 sends the television remote control output signal(s) to the camera 102 at block 620.

At block 622, the process 600 receives and displays modified (e.g., edited) output from the camera 102. For example, a first modified output may include output of a selected one of the set of thumbnail images received in response to sending television remote control output signals received from the television remote control device 108 to the camera 102 that are converted by the camera 102 into a camera user interface selection command. During subsequent iterations of the process 600, changes to the user interface and/or the selected image resulting from television remote control output signals that are sent to the camera 102 may be received and displayed.

At decision point 624, the process 600 makes a determination as to whether the editing session is completed. An editing session may be completed, for example, in response to an indication from the camera 102 that a camera user interface command indicating termination of an editing session has been received via the television remote control output signals.

When a determination is made that the editing session is not completed, the process 600 returns to decision point 618 and iterates as described above. When a determination is made that the editing session is completed, the process 600 returns to decision point 604 to await a start of a new editing session.

As such, the process 600 communicates with the camera 102 to establish an editing session for images stored in association with the camera 102. The process 600 responds to requests for configuration information, such as television information (e.g., television manufacturer, television model, and configured display refresh rate and resolution). The process 600 receives and forwards television remote control output signals to the camera 102 for conversion and processing into camera user interface commands. The process 600 receives and displays the camera user interface output, including edited images, on a display associated with the television 104.

As described above, many variations on the processing described in association with the present subject matter are possible. For example, the television 104 may manage communications between the television 104 and the camera 102, such as detecting a connection to a camera and querying the camera to determine whether the camera includes television remote control editing capabilities rather than waiting for receipt of an indication from the camera 102. The additional processing described above in association with such an implementation may be performed within a process such as the process 600. As another example, the camera 102 and the television 104 may negotiate to determine which device performs the conversion of the received television remote control output signals to the camera image editing commands. The additional processing described above in association with such an implementation may be performed within processes such as the process 500 and the process 600. As such, the processes of FIG. 5 and FIG. 6 may be modified accordingly to implement and accommodate any such implementation without departure from the scope of the present subject matter. Many other variations on the example processes are possible and all are considered within the scope of the present subject matter.

Thus, in accord with certain implementations, a method of editing images stored in a camera using a television involves receiving, at the camera, television remote control output signals; converting the television remote control output signals to camera image editing commands; editing an image stored in a memory associated with the camera based upon the camera image editing commands; and outputting the edited image to the television.

In certain implementations, where the method of editing images stored in a camera using a television involves receiving, at the camera, the television remote control output signals, the method involves receiving the television remote control output signals from the television. In certain implementations, the method of receiving, at the camera, the television remote control output signals involves receiving the television remote control output signals via a signaling input module associated with the camera. In certain implementations, the method of receiving, at the camera, the television remote control output signals and outputting the edited image to the television involves receiving the television remote control output signals and outputting the edited image to the television via a universal serial bus (USB) connection with the television. In certain implementations, the method further involves detecting a connection to the television; sending an indication to the television that the camera includes television remote control editing capabilities; receiving television identification information from the television in response to sending the indication that the camera includes the television remote control editing capabilities; selecting television remote control command translation information based upon the received television identification information; and where converting the television remote control output signals to the camera image editing commands involves converting the television remote control output signals to the camera image editing commands using the selected television remote control command translation information. In certain implementations, the method further involves determining television identification information based upon the received television remote control output signals; selecting television remote control command translation information based upon the determined television identification information; and where converting the television remote control output signals to the camera image editing commands involves converting the television remote control output signals to the camera image editing commands using the selected television remote control command translation information. In certain implementations, the method of editing the image stored in the memory associated with the camera based upon the camera image editing commands involves modifying, in response to each camera image editing command, the stored image based upon each camera image editing command. In certain implementations, the method further involves refreshing the output of the edited image to the television in response to each modification of the stored image. In certain implementations, the method of editing the image stored in the memory associated with the camera based upon the camera image editing commands involves, for each camera image editing command, retrieving the stored image from the memory associated with the camera; modifying the stored image based upon the camera image editing command; and storing the modified image in the memory. In certain implementations, the method of editing the image stored in the memory associated with the camera based upon the camera image editing commands involves at least one of rotating the image; cropping the image; adjusting contrast of the image; adjusting a brightness of the image; eliminating red-eye effects within the image; morphing the image; drawing on top of the image; and changing color of the image. In certain implementations, the camera image editing commands include camera user interface image editing commands and the method of outputting the edited image to the television involves outputting a camera user interface to the television including the edited image; and outputting camera user interface objects resulting from the camera user interface image editing commands. In certain implementations, the method of outputting the camera user interface objects resulting from the camera user interface image editing commands involves, for each camera user interface image editing command, outputting a changed camera user interface to the television including a change to at least one of the camera user interface objects resulting from each camera user interface editing command and a change to the edited image. In certain implementations, the method further involves querying the television for a refresh rate of a display associated with the television; and outputting the edited image to the television involves continually outputting the edited image to the television at the refresh rate of the display associated with the television. In certain implementations, the method further involves querying the television for a display resolution of a display associated with the television; and outputting the edited image to the television involves outputting the edited image to the television at the display resolution of the display associated with the television. In certain implementations, the method further involves detecting a connection to the television; and outputting a set of thumbnail images to the television. In certain implementations, the method further involves selecting one of the set of thumbnail images in response to the camera image editing selection command; where editing the image stored in the memory associated with the camera based upon the camera image editing commands involves editing the selected one of the set of thumbnail images; where receiving, at the camera, television remote control output signals involves receiving a first television remote control output signal; and where converting the television remote control output signals to the camera image editing commands involves converting the first television remote control output signal to a camera image editing selection command. In certain implementations, the method further involves determining that a bi-directional messaging interface with the television is not available; outputting a list of television manufacturers and television model information; and outputting a prompt requesting a user selection of a television manufacturer and television model information from the list of television manufacturers and television model information. In certain implementations, the method further involves receiving a selection of one of the television manufacturers and television model information; and selecting command translation information based upon the selected one of the television manufacturers and television model information. In certain implementations, the method of editing the image stored in the memory associated with the camera based upon the camera image editing commands involves performing a bulk editing operation on all images stored in the memory associated with the camera.

In another implementation, a computer readable storage medium may store instructions which, when executed on one or more programmed processors, carry out a process of editing images stored in a camera using a television involving receiving, at the camera, television remote control output signals; converting the television remote control output signals to camera image editing commands; editing an image stored in a memory associated with the camera based upon the camera image editing commands; and outputting the edited image to the television.

In another implementation, the method of editing images stored in a camera using a television involves determining, via the television, that the camera includes television remote control editing capabilities; sending television remote control output signals to the camera; receiving an edited image from the camera; and displaying the edited image on a display associated with the television.

In certain implementations, where the method of editing images stored in a camera using a television involves determining, via the television, that the camera includes the television remote control editing capabilities, the method involves receiving an indication from the camera that the camera includes the television remote control editing capabilities. In certain implementations, the method further involves sending television identification information associated with the television to the camera in response to receipt of the indication that the camera includes the television remote control editing capabilities. In certain implementations, the method of determining, via the television, that the camera includes the television remote control editing capabilities involves detecting a connection to the camera; receiving signaling from the camera; and determining the camera includes the television remote control editing capabilities based upon the received signaling. In certain implementations, the method further involves sending television identification information associated with the television to the camera in response to determining the camera includes the television remote control editing capabilities. In certain implementations, the method of sending the television identification information associated with the television to the camera in response to determining the camera includes the television remote control editing capabilities involves sending a sequence of television remote control output signals to the camera. In certain implementations, the television identification information includes at least one of television manufacturer information and television model information associated with the television. In certain implementations, the method of sending the television remote control output signals to the camera involves sending television remote control output signals received from a television remote control device to the camera; and the method of receiving the edited image from the camera involves receiving the edited image from the camera in response to sending the television remote control output signals received from the television remote control device to the camera. In certain implementations, the method further involves querying the camera regarding television remote control output signal conversion; determining, based upon a response to the query, to convert the television remote control output signals to camera image editing commands at the television; and where sending the television remote control output signals to the camera involves sending the camera image editing commands to the camera. In certain implementations, the method further involves receiving camera information from the camera; and selecting television remote control command translation information based upon the received camera information. In certain implementations, the method further involves converting the television remote control output signals to camera image editing commands; and where sending the television remote control output signals to the camera involves sending the converted camera image editing commands to the camera. In certain implementations, the method of receiving the edited image from the camera involves receiving refreshed output of the edited image at the television in response to each modification of the edited image. In certain implementations, the method of receiving the edited image from the camera involves receiving the edited image from the camera via a universal serial bus (USB) connection with the camera. In certain implementations, the method further involves receiving a request for television identification information from the camera; and sending the television identification information to the camera, where the camera selects television remote control command translation information based upon the television identification information and converts the television remote control output signals to camera image editing commands using the selected television remote control command translation information. In certain implementations, the method of receiving the edited image from the camera involves receiving a camera user interface including the edited image. In certain implementations, the method of displaying the edited image on the display associated with the television involves displaying the received camera user interface including the edited image. In certain implementations, the method further involves receiving a query from the camera for a refresh rate of the display associated with the television; sending the refresh rate of the display to the camera; and where receiving the edited image from the camera involves continually receiving the edited image from the camera at the refresh rate of the display associated with the television. In certain implementations, the method further involves receiving a query from the camera for a display resolution of the display associated with the television; sending the display resolution of the display to the camera; and where receiving the edited image from the camera involves receiving the edited image from the camera at the display resolution of the display associated with the television. In certain implementations, the method further involves receiving a set of thumbnail images from the camera; and where receiving the edited image from the camera involves receiving a selected one of the set of thumbnail images in response to sending the television remote control output signals to the camera.

In another implementation, a computer readable storage medium may store instructions which, when executed on one or more programmed processors, carry out a process of editing images stored in a camera using a television involving determining, via the television, that the camera includes television remote control editing capabilities; sending television remote control output signals to the camera; receiving an edited image from the camera; and displaying the edited image on a display associated with the television.

An apparatus for editing images using a television consistent with certain implementations has a memory adapted to store images. A processor is programmed to receive television remote control output signals; convert the television remote control output signals to camera image editing commands; edit an image stored in the memory based upon the camera image editing commands; and output the edited image to the television.

In certain implementations, the processor, in being programmed to receive the television remote control output signals, is programmed to receive the television remote control output signals from the television. In certain implementations, the apparatus has a signaling input module; and, the processor, in being programmed to receive the television remote control output signals, is programmed to receive the television remote control output signals via the signaling input module. In certain implementations, the processor, in being programmed to receive the television remote control output signals and output the edited image to the television, is programmed to receive the television remote control output signals and output the edited image to the television via a universal serial bus (USB) connection with the television. In certain implementations, the processor is further programmed to detect a connection to the television; send an indication to the television that the processor includes television remote control editing capabilities; receive television identification information from the television in response to sending the indication that the processor includes the television remote control editing capabilities; select television remote control command translation information based upon the received television identification information; and where, in being programmed to convert the television remote control output signals to the camera image editing commands, the processor is programmed to convert the television remote control output signals to the camera image editing commands using the selected television remote control command translation information. In certain implementations, the processor is further programmed to determine television identification information based upon the received television remote control output signals; select television remote control command translation information based upon the determined television identification information; and where, in being programmed to convert the television remote control output signals to the camera image editing commands, the processor is programmed to convert the television remote control output signals to the camera image editing commands using the selected television remote control command translation information. In certain implementations, the processor, in being programmed to edit the image stored in the memory based upon the camera image editing commands, is programmed to modify, in response to each camera image editing command, the stored image based upon each camera image editing command. In certain implementations, the processor is further programmed to refresh the output of the edited image to the television in response to each modification of the stored image. In certain implementations, the processor, in being programmed to edit the image stored in the memory based upon the camera image editing commands, is programmed to, for each camera image editing command, retrieve the stored image from the memory; modify the stored image based upon the camera image editing command; and store the modified image in the memory. In certain implementations, the processor, in being programmed to edit the image stored in the memory based upon the camera image editing commands, is programmed to at least one of rotate the image; crop the image; adjust contrast of the image; adjust a brightness of the image; eliminate red-eye effects within the image; morph the image; draw on top of the image; and change color of the image. In certain implementations, the camera image editing commands includes camera user interface image editing commands and, where, in being programmed to output the edited image to the television, the processor is programmed to output a camera user interface to the television including the edited image; and output camera user interface objects resulting from the camera user interface image editing commands. In certain implementations, the processor, in being programmed to output the camera user interface objects resulting from the camera user interface image editing commands, is programmed to, for each camera user interface image editing command, output a changed camera user interface to the television including a change to at least one of the camera user interface objects resulting from each camera user interface editing command and a change to the edited image. In certain implementations, the processor is further programmed to query the television for a refresh rate of a display associated with the television; and where, in being programmed to output the edited image to the television, the processor is programmed to continually output the edited image to the television at the refresh rate of the display associated with the television. In certain implementations, the processor is further programmed to query the television for a display resolution of a display associated with the television; and where, in being programmed to output the edited image to the television, the processor is programmed to output the edited image to the television at the display resolution of the display associated with the television. In certain implementations, the processor is further programmed to detect a connection to the television; and output a set of thumbnail images to the television. In certain implementations, the processor is further programmed to select one of the set of thumbnail images in response to the camera image editing selection command; and where, in being programmed to edit the image stored in the memory based upon the camera image editing commands, the processor is programmed to edit the selected one of the set of thumbnail images; where, in being programmed to receive television remote control output signals, the processor is programmed to receive a first television remote control output signal; and, where, in being programmed to convert the television remote control output signals to the camera image editing commands, the processor is programmed to convert the first television remote control output signal to a camera image editing selection command. In certain implementations, the processor is further programmed to determine that a bi-directional messaging interface with the television is not available; output a list of television manufacturers and television model information; and output a prompt requesting a user selection of a television manufacturer and television model information from the list of television manufacturers and television model information. In certain implementations, the processor is further programmed to receive a selection of one of the television manufacturers and television model information; and select command translation information based upon the selected one of the television manufacturers and television model information. In certain implementations, the processor, in being programmed to edit the image stored in the memory based upon the camera image editing commands, is programmed to perform a bulk editing operation on all images stored in the memory.

A television apparatus for editing images stored in a camera consistent with another implementation has a display and a processor programmed to determine that the camera includes television remote control editing capabilities; send television remote control output signals to the camera; receive an edited image from the camera; and display the edited image on the display.

In certain implementations, the processor, in being programmed to determine that the camera includes the television remote control editing capabilities, is programmed to receive an indication from the camera that the camera includes the television remote control editing capabilities. In certain implementations, the processor is further programmed to send television identification information to the camera in response to receipt of the indication that the camera includes the television remote control editing capabilities. In certain implementations, the processor, in being programmed to determine that the camera includes the television remote control editing capabilities, is programmed to detect a connection to the camera; receive signaling from the camera; and determine the camera includes the television remote control editing capabilities based upon the received signaling. In certain implementations, the processor is further programmed to send television identification information to the camera in response to determining the camera includes the television remote control editing capabilities. In certain implementations, the processor, in being programmed to send the television identification information to the camera in response to determining the camera includes the television remote control editing capabilities, is programmed to send a sequence of television remote control output signals to the camera. In certain implementations, the television identification information includes at least one of television manufacturer information and television model information. In certain implementations, the processor, in being programmed to send the television remote control output signals to the camera, is programmed to send television remote control output signals received from a television remote control device to the camera; and in being programmed to receive the edited image from the camera, is programmed to receive the edited image from the camera in response to sending the television remote control output signals received from the television remote control device to the camera. In certain implementations, the processor is further programmed to query the camera regarding television remote control output signal conversion; determine, based upon a response to the query, to convert the television remote control output signals to camera image editing commands; and where, in being programmed to send the television remote control output signals to the camera, the processor is programmed to send the camera image editing commands to the camera. In certain implementations, the processor is further programmed to receive camera information from the camera; and select television remote control command translation information based upon the received camera information. In certain implementations, the processor is further programmed to convert the television remote control output signals to camera image editing commands; and where, in being programmed to send the television remote control output signals to the camera, the processor is programmed to send the converted camera image editing commands to the camera. In certain implementations, the processor, in being programmed to receive the edited image from the camera, is programmed to receive refreshed output of the edited image in response to each modification of the edited image. In certain implementations, the processor, in being programmed to receive the edited image from the camera, is programmed to receive the edited image from the camera via a universal serial bus (USB) connection with the camera. In certain implementations, the processor is further programmed to receive a request for television identification information from the camera; and send the television identification information to the camera, where the camera selects television remote control command translation information based upon the television identification information and converts the television remote control output signals to camera image editing commands using the selected television remote control command translation information. In certain implementations, the processor, in being programmed to receive the edited image from the camera, is programmed to receive a camera user interface including the edited image. In certain implementations, the processor, in being programmed to display the edited image on the display, is programmed to display the received camera user interface including the edited image. In certain implementations, the processor is further programmed to receive a query from the camera for a refresh rate of the display; send the refresh rate of the display to the camera; and where, in being programmed to receive the edited image from the camera, the processor is programmed to continually receive the edited image from the camera at the refresh rate of the display. In certain implementations, the processor is further programmed to receive a query from the camera for a display resolution of the display; send the display resolution of the display to the camera; and where, in being programmed to receive the edited image from the camera, the processor is programmed to receive the edited image from the camera at the display resolution of the display. In certain implementations, the processor is further programmed to receive a set of thumbnail images from the camera; and where, in being programmed to receive the edited image from the camera, the processor is programmed to receive a selected one of the set of thumbnail images in response to sending the television remote control output signals to the camera.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of editing images stored in a camera using a television, comprising:
   determining, via the television, that the camera comprises television remote control editing capabilities;
   sending television identification information associated with the television to the camera in response to determining the camera comprises the television remote control editing capabilities, where sending the television identification information associated with the television to the camera in response to determining the camera comprises the television remote control editing capabilities comprises sending a sequence of television remote control output signals to the camera;
   receiving an edited image from the camera; and
   displaying the edited image on a display associated with the television.

2. The method of claim 1, where determining, via the television, that the camera comprises the television remote control editing capabilities comprises receiving an indication from the camera that the camera comprises the television remote control editing capabilities.

3. The method of claim 2, further comprising sending television identification information associated with the television to the camera in response to receipt of the indication that the camera comprises the television remote control editing capabilities.

4. The method of claim 1, where determining, via the television, that the camera comprises the television remote control editing capabilities comprises:
   detecting a connection to the camera;
   receiving signaling from the camera; and
   determining the camera comprises the television remote control editing capabilities based upon the received signaling.

5. The method of claim 1, where the television identification information comprises at least one of television manufacturer information and television model information associated with the television.

6. The method according to claim 1, where:
   sending the television remote control output signals to the camera comprises sending television remote control output signals received from a television remote control device to the camera; and
   receiving the edited image from the camera comprises receiving the edited image from the camera in response to sending the television remote control output signals received from the television remote control device to the camera.

7. The method of claim 1, further comprising:
   querying the camera regarding television remote control output signal conversion;
   determining, based upon a response to the query, to convert the television remote control output signals to camera image editing commands at the television; and
   where sending the television remote control output signals to the camera comprises sending the camera image editing commands to the camera.

8. The method according to claim 1, further comprising:
   receiving camera information from the camera; and
   selecting television remote control command translation information based upon the received camera information.

9. The method of claim 8, further comprising:
   converting the television remote control output signals to camera image editing commands; and
   where sending the television remote control output signals to the camera comprises sending the converted camera image editing commands to the camera.

10. The method according to claim 1, where receiving the edited image from the camera comprises receiving refreshed output of the edited image at the television in response to each modification of the edited image.

11. The method according to claim 1, where receiving the edited image from the camera comprises receiving the edited image from the camera via a universal serial bus (USB) connection with the camera.

12. The method according to claim 1, further comprising:
    receiving a request for television identification information from the camera; and
    sending the television identification information to the camera, where the camera selects television remote control command translation information based upon the television identification information and converts the television remote control output signals to camera image editing commands using the selected television remote control command translation information.

13. The method of claim 1, where receiving the edited image from the camera comprises receiving a camera user interface comprising the edited image.

14. The method of claim 13, where displaying the edited image on the display associated with the television comprises displaying the received camera user interface comprising the edited image.

15. The method according to claim 1, further comprising:
    receiving a query from the camera for a refresh rate of the display associated with the television;
    sending the refresh rate of the display to the camera; and
    where receiving the edited image from the camera comprises continually receiving the edited image from the camera at the refresh rate of the display associated with the television.

16. The method according to claim 1, further comprising:
    receiving a query from the camera for a display resolution of the display associated with the television;
    sending the display resolution of the display to the camera; and
    where receiving the edited image from the camera comprises receiving the edited image from the camera at the display resolution of the display associated with the television.

17. The method according to claim 1, further comprising:
    receiving a set of thumbnail images from the camera; and where receiving the edited image from the camera comprises receiving a selected one of the set of thumbnail images in response to sending the television remote control output signals to the camera.

18. A computer readable non-transitory storage medium storing instructions which, when executed on one or more programmed processors, carry out a method according to claim 1.

19. A television apparatus for editing images stored in a camera, comprising:
   a display; and
   a processor programmed to:
      determine that the camera comprises television remote control editing capabilities;
      send television identification information to the camera in response to determining the camera comprises the television remote control editing capabilities;
      where, in being programmed to send the television identification information to the camera in response to determining the camera comprises the television remote control editing capabilities, the processor is programmed to send a sequence of television remote control output signals to the camera;
      send television remote control output signals to the camera;
      receive an edited image from the camera; and
      display the edited image on the display.

20. The television apparatus of claim 19, where, in being programmed to determine that the camera comprises the television remote control editing capabilities, the processor is programmed to receive an indication from the camera that the camera comprises the television remote control editing capabilities.

21. The television apparatus of claim 20, where the processor is further programmed to send television identification information to the camera in response to receipt of the indication that the camera comprises the television remote control editing capabilities.

22. The television apparatus of claim 19, where, in being programmed to determine that the camera comprises the television remote control editing capabilities, the processor is programmed to:
   detect a connection to the camera;
   receive signaling from the camera; and
   determine the camera comprises the television remote control editing capabilities based upon the received signaling.

23. The television apparatus of claim 19, where the television identification information comprises at least one of television manufacturer information and television model information.

24. The television apparatus according to claim 19, where, in being programmed to:
   send the television remote control output signals to the camera, the processor is programmed to send television remote control output signals received from a television remote control device to the camera; and
   receive the edited image from the camera, the processor is programmed to receive the edited image from the camera in response to sending the television remote control output signals received from the television remote control device to the camera.

25. The television apparatus of claim 19, where the processor is further programmed to:
   query the camera regarding television remote control output signal conversion;
   determine, based upon a response to the query, to convert the television remote control output signals to camera image editing commands; and
   where, in being programmed to send the television remote control output signals to the camera, the processor is programmed to send the camera image editing commands to the camera.

26. The television apparatus according to claim 19, where the processor is further programmed to:
   receive camera information from the camera; and
   select television remote control command translation information based upon the received camera information.

27. The television apparatus of claim 26, where the processor is further programmed to:
   convert the television remote control output signals to camera image editing commands; and
   where, in being programmed to send the television remote control output signals to the camera, the processor is programmed to send the converted camera image editing commands to the camera.

28. The television apparatus according to claim 19, where, in being programmed to receive the edited image from the camera, the processor is programmed to receive refreshed output of the edited image in response to each modification of the edited image.

29. The television apparatus according to claim 19, where, in being programmed to receive the edited image from the camera, the processor is programmed to receive the edited image from the camera via a universal serial bus (USB) connection with the camera.

30. The television apparatus according to claim 19, where the processor is further programmed to:
   receive a request for television identification information from the camera; and
   send the television identification information to the camera, where the camera selects television remote control command translation information based upon the television identification information and converts the television remote control output signals to camera image editing commands using the selected television remote control command translation information.

31. The television apparatus of claim 19, where, in being programmed to receive the edited image from the camera, the processor is programmed to receive a camera user interface comprising the edited image.

32. The television apparatus of claim 31, where, in being programmed to display the edited image on the display, the processor is programmed to display the received camera user interface comprising the edited image.

33. The television apparatus according to claim 19, where the processor is further programmed to:
   receive a query from the camera for a refresh rate of the display;
   send the refresh rate of the display to the camera; and
   where, in being programmed to receive the edited image from the camera, the processor is programmed to continually receive the edited image from the camera at the refresh rate of the display.

34. The television apparatus according to claim 19, where the processor is further programmed to:
   receive a query from the camera for a display resolution of the display;
   send the display resolution of the display to the camera; and where, in being programmed to receive the edited image from the camera, the processor is programmed to receive the edited image from the camera at the display resolution of the display.

35. The television apparatus according to claim 19, where the processor is further programmed to:
   receive a set of thumbnail images from the camera; and
   where, in being programmed to receive the edited image from the camera, the processor is programmed to receive a selected one of the set of thumbnail images in response to sending the television remote control output signals to the camera.

36. A method of editing images stored in a camera using a television, comprising:
   determining, via the television, that the camera comprises television remote control editing capabilities;
   querying the camera regarding television remote control output signal conversion;
   determining, based upon a response to the query, to convert the television remote control output signals to camera image editing commands at the television;
   sending television remote control output signals to the camera, where sending the television remote control output signals to the camera comprises sending the camera image editing commands to the camera;
   receiving an edited image from the camera; and
   displaying the edited image on a display associated with the television.

37. A method of editing images stored in a camera using a television, comprising:
   determining, via the television, that the camera comprises television remote control editing capabilities;
   receiving camera information from the camera;
   selecting television remote control command translation information based upon the received camera information converting the television remote control output signals to camera image editing commands;
   sending television remote control output signals to the camera, where sending the television remote control output signals to the camera comprises sending the converted camera image editing commands to the camera;
   receiving an edited image from the camera; and
   displaying the edited image on a display associated with the television.

38. A method of editing images stored in a camera using a television, comprising:
   determining, via the television, that the camera comprises television remote control editing capabilities;
   receiving a request for television identification information from the camera; and
   sending the television identification information to the camera;
   sending television remote control output signals to the camera;
   receiving an edited image from the camera;
   displaying the edited image on a display associated with the television;
   where the camera selects television remote control command translation information based upon the television identification information and converts the television remote control output signals to camera image editing commands using the selected television remote control command translation information.

39. A television apparatus for editing images stored in a camera, comprising:
   a display; and
   a processor programmed to:
   determine that the camera comprises television remote control editing capabilities;
   query the camera regarding television remote control output signal conversion;
   determine, based upon a response to the query, to convert the television remote control output signals to camera image editing commands;
   send television remote control output signals to the camera as camera image editing commands;
   receive an edited image from the camera; and
   display the edited image on the display.

40. A television apparatus for editing images stored in a camera, comprising:
   a display; and
   a processor programmed to:
   determine that the camera comprises television remote control editing capabilities;
   receive camera information from the camera;
   select television remote control command translation information based upon the received camera information;
   convert the television remote control output signals to camera image editing commands;
   send television remote control output signals to the camera, where, in being programmed to send the television remote control output signals to the camera, the processor is programmed to send the converted camera image editing commands to the camera;
   receive an edited image from the camera; and
   display the edited image on the display.

41. A television apparatus for editing images stored in a camera, comprising:
   a display; and
   a processor programmed to:
   determine that the camera comprises television remote control editing capabilities;
   receive a request for television identification information from the camera;
   send the television identification information to the camera;
   send television remote control output signals to the camera, where the camera selects television remote control command translation information based upon the television identification information and converts the television remote control output signals to camera image editing commands using the selected television remote control command translation information;
   receive an edited image from the camera; and
   display the edited image on the display.

* * * * *